United States Patent
Tsubata et al.

(10) Patent No.: US 7,575,836 B2
(45) Date of Patent: Aug. 18, 2009

(54) COLOR FILTER SUBSTRATE, FABRICATION METHOD FOR THE SAME, AND DISPLAY DEVICE

(75) Inventors: Toshihide Tsubata, Tsu (JP); Tsuyoshi Tokuda, Tsu (JP)

(73) Assignee: Sharp Kabushiki Kaisha, Osaka (JP)

(*) Notice: Subject to any disclaimer, the term of this patent is extended or adjusted under 35 U.S.C. 154(b) by 671 days.

(21) Appl. No.: 11/015,484

(22) Filed: Dec. 17, 2004

(65) Prior Publication Data

US 2005/0142466 A1     Jun. 30, 2005

(30) Foreign Application Priority Data

Dec. 25, 2003    (JP) ............... 2003-429719

(51) Int. Cl.
  *G02B 5/20*    (2006.01)
  *G02F 1/1335*  (2006.01)
(52) U.S. Cl. ........................................... 430/7
(58) Field of Classification Search ........... None
  See application file for complete search history.

(56) References Cited

U.S. PATENT DOCUMENTS 5,645,963 A * 7/1997 Chang ..................... 430/7
6,060,199 A * 5/2000 Nagata et al. ............ 430/7
2001/0000437 A1* 4/2001 Tanaka et al. ........... 349/110
2003/0007111 A1* 1/2003 Hsu et al. ................ 349/106

FOREIGN PATENT DOCUMENTS

| JP | 08-075913 A | 3/1996 |
| JP | 2001-100221 | 4/2001 |
| JP | 2001-296523 | 10/2001 |
| JP | 2002-071929 | 3/2002 |
| JP | 2002-286927 | 10/2002 |

OTHER PUBLICATIONS

Official communication issued in the counterpart Japanese Application No. 2003-429719, mailed on Jan. 9, 2007.

* cited by examiner

*Primary Examiner*—John A. McPherson
(74) *Attorney, Agent, or Firm*—Keating & Bennett, LLP

(57) ABSTRACT

The fabrication method for a color filter substrate of the present invention includes the step of forming a coloring layer, which includes the steps of: forming first coloring lines each including a plurality of first coloring portions lined in a first direction with a gap given between the adjacent first coloring portions; and forming second coloring lines after the formation of the first coloring lines. The step of forming second coloring lines includes the step of pressing a dry film for the second coloring lines against a substrate to stick the dry film on the substrate along a third direction crossing the first direction.

16 Claims, 12 Drawing Sheets

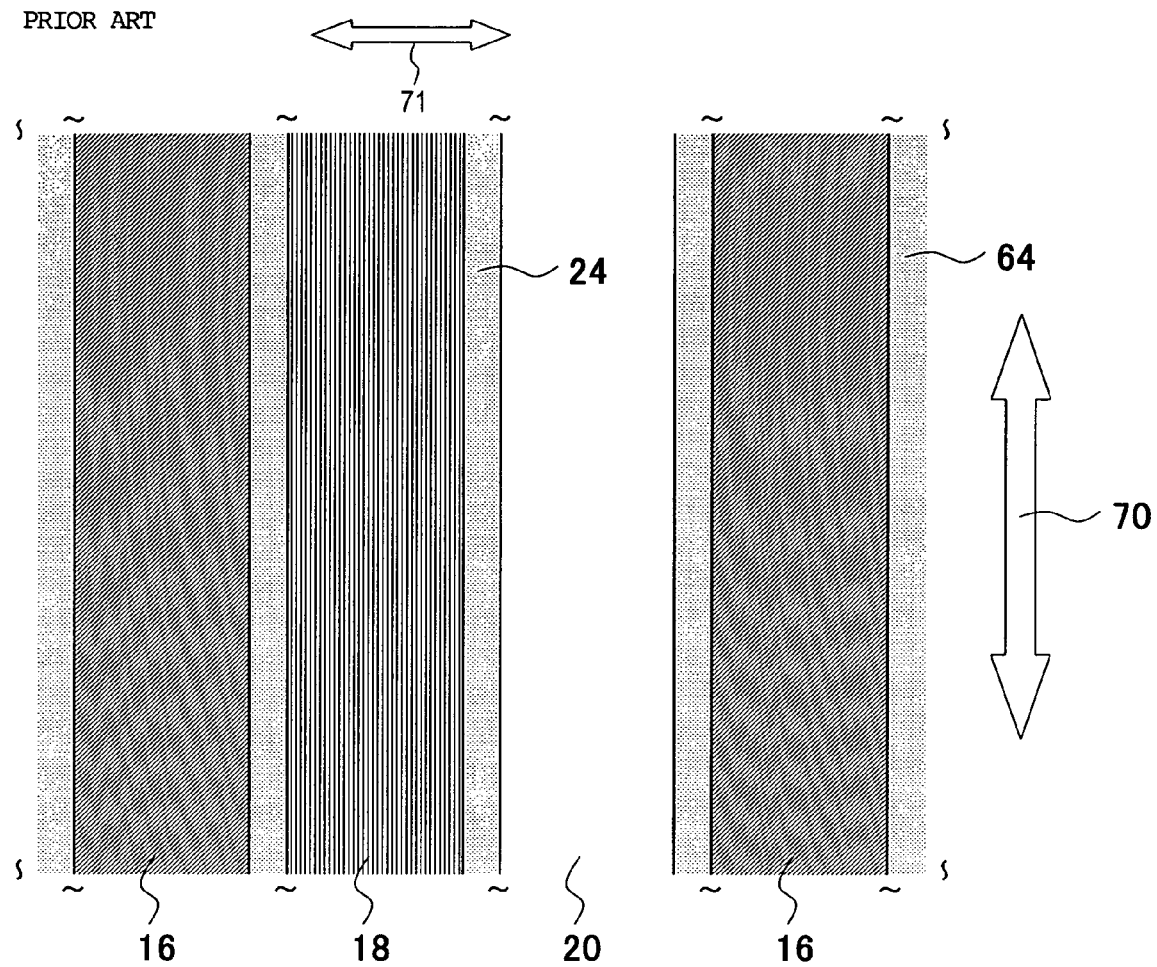

COLOR FILTER SUBSTRATE, FABRICATION METHOD FOR THE SAME, AND DISPLAY DEVICE

BACKGROUND OF THE INVENTION

The present invention relates to a color filter substrate used in display devices such as color liquid crystal displays, and to a fabrication method for such a color filter substrate.

Liquid crystal display devices are being widely used in various types of electronic equipment because of their features of being small, thin and light in weight and consuming low power. In particular, active matrix liquid crystal display devices having switching elements are being widely used for office automation equipment such as personal computers, audio-visual equipment such as television sets, mobile phones and the like. In recent years, rapid progress has been made in improving the quality of liquid display devices, such as increasing the size, improving the definition, increasing the effective pixel area ratio (aperture ratio) and improving the color purity.

The structure of an ordinary active matrix liquid crystal display device will be described with reference to FIG. 10. FIG. 10 is a diagrammatic cross-sectional view of a liquid crystal display device.

As shown in FIG. 10, the liquid crystal display device 30 has an active matrix substrate 2 and a color filter substrate 4 opposed to each other, and a liquid crystal layer 6 interposed between these substrates.

The active matrix substrate 2 includes a transparent insulating substrate 8 made of glass and the like, and gate bus lines (not shown) as scanning signal lines, source bus lines 10 as data signal lines, active elements (not shown) such as thin film transistors (TFTs) and transparent pixel electrodes 12 formed on the substrate 8. The plurality of pixel electrodes 12 are arranged in a matrix in the display region.

The color filter substrate 4 includes a transparent insulating substrate 14 made of glass and the like, and a color filter layer 22 composed of red color filter lines 16, green color filter lines 18 and blue color filter lines 20, a light shield layer 26 having a plurality of black matrix portions 24, and a counter electrode (not shown) formed on the substrate 14. The red color filter lines 16, the green color filter lines 18 and the blue color filter lines 20 are provided to correspond to the plurality of transparent pixel electrodes 12 formed in the active matrix substrate 2. The light shield layer 26 is provided so that its black matrix portions 24 exist in the gaps between the color filters and in the frame region.

An example of a fabrication method for the color filter substrate 4 will be described (see Japanese Laid-Open Patent Publication No. 2001-100221).

In recent years, a dry film method has been used for fabrication of a color filter substrate. The dry film method has the advantages that the yield of materials is high and the fabrication cost can be reduced, compared with the spin coat method conventionally used. In addition, by forming the color filter layer and the light shield layer with dry films, the thickness of these layers can be made more uniform.

A fabrication method for a color filter substrate using the dry film method will be described with reference to FIGS. 11A to 11F.

A dry film is composed of a photosensitive resin layer and film supports made of a polyethylene terephthalate (PET) film and the like sandwiching the photosensitive resin layer from both major surfaces. Four kinds of dry films in which red, blue, green and black pigments are respectively dispersed in the photosensitive resin films are used. Typically, the photosensitive resin films are of a negative type.

First, the red dry film, for example, is pressed against the glass substrate 14 with a roller 34 (see FIG. 6) to be stuck on the glass substrate 14, and then the film support is removed, so that a red photosensitive resin layer 16R is transferred onto the substrate 14 as shown in FIG. 11A. This process step is generally performed under heating of the dry film and thus is a thermal transfer step. The transferred red photosensitive resin layer 16R is then exposed to light via a mask 32 and developed, to thereby form the red color filter lines 16 as shown in FIG. 11B.

The same step as that described above is then performed using the green dry film, for example, to form the green color filter lines 18 as shown in FIG. 11C. Likewise, the same step as that described above is performed using the blue dry film to form the blue color filter lines 20 as shown in FIG. 11D. In this way, the color filter layer 22 composed of the red, green and blue color filter lines 16, 18 and 20 is formed.

After the formation of the color filter layer 22, the light shield layer 26 having the black matrix portions 24 given in the gaps between the adjacent color filter lines and in the frame region is formed using the black dry film in the same manner as that for the formation of the color filter lines described above.

The color filter substrate is thus fabricated. FIG. 12 is a partial plan view of the resultant color filter substrate.

In the conventional fabrication method for a color filter substrate described above, for formation of the green color filter lines 18, the blue color filter lines 20 and the black matrix portions 24, the dry films are pressed against the substrate to be stuck on the substrate along a direction parallel to the extension of the stripe-shaped color filter lines (direction of the arrow 70 in FIG. 12).

The reason for the above is as follows. If a dry film is not pressed to be stuck along a direction parallel to the extension of color filter lines previously formed on the substrate, the previously formed color filter lines will block the air existing between the dry film and the substrate from escaping outside, resulting in bubbles remaining between the black matrix and the substrate, and thus causing degradation in display quality such as occurrence of color dropouts.

For the above reason, after formation of one kind of stripe-shaped color filter lines on the substrate, the adhesion direction of a dry film for another kind of color filter lines or black matrix portions to be formed next is limited to only one direction.

For example, in the case of forming color filter lines on a transparent insulating substrate in the shape of a rectangle of 680 mm×880 mm so as to extend along the shorter side of the substrate, once color filter lines of one color are first formed, the adhesion direction of a dry film for color filter lines of another color to be formed next is limited to the direction along the shorter side of the substrate (direction of extension of the color filter lines of the first color). Accordingly, a dry film having a width of 880 mm must be prepared. In the conventional fabrication method, therefore, use of a narrower dry film is not allowed.

In view of the above, an object of the present invention is providing a fabrication method for a color filter substrate that can minimize degradation in display quality and is high in degree of freedom in the adhesion direction of a dry film, such a color filter substrate, and a display device using such a color filter substrate.

SUMMARY OF THE INVENTION

The color filter substrate of the present invention includes a transparent substrate having a first edge and a second edge opposed to each other and a coloring layer provided on the transparent substrate. The coloring layer includes a plurality of coloring lines that extend in a first direction from the first edge to the second edge, and are placed side by side in a second direction crossing the first direction. The plurality of coloring lines include first coloring lines and second coloring lines. The fabrication method for a color filter substrate of the present invention includes the step of forming the coloring layer. The step of forming the coloring layer includes the steps of: forming the first coloring lines each including a plurality of first coloring portions lined in the first direction with a gap given between the adjacent first coloring portions; and forming the second coloring lines after the formation of the first coloring lines. The step of forming the second coloring lines includes the step of pressing a dry film for the second coloring lines against the transparent substrate to stick the dry film on the transparent substrate along a third direction crossing the first direction.

In one embodiment, the step of forming the coloring layer includes the step of forming dummy coloring portions in the gaps using the dry film for the second coloring lines.

In another embodiment, the plurality of coloring lines further include third coloring lines, the step of forming the coloring layer includes the steps of: forming the second coloring lines each including a plurality of second coloring portions lined in the first direction with a gap given between the adjacent second coloring portions; and forming the third coloring lines after the formation of the second coloring lines, and the step of forming the third coloring lines includes the step of pressing a dry film for the third coloring lines against the transparent substrate to stick the dry film on the transparent substrate along a fourth direction crossing the first direction.

In yet another embodiment, the step of forming the coloring layer includes the step of forming dummy coloring portions in the gaps using the dry film for the third coloring lines.

In yet another embodiment, the distance between the gaps adjacent in the first direction is 1000 µm or less.

In yet another embodiment, the width of the gaps in the first direction is 10 µm or less.

In yet another embodiment, the step of forming the coloring lines formed last among the coloring lines of the coloring layer includes the step of performing back exposure using the previously-formed coloring lines as a mask.

In yet another embodiment, the dummy coloring portions are formed using a blue dry film.

In yet another embodiment, the dummy coloring portions are formed using a black dry film.

In yet another embodiment, the third direction is roughly orthogonal to the first direction.

In yet another embodiment, the fourth direction is roughly orthogonal to the first direction.

In yet another embodiment, the coloring layer includes coloring lines adjacent in the second direction having edges overlapping each other.

The first coloring lines may be formed by at least one method selected from the group consisting of a spin coat method, a die coat method, an ink jet method and a dry film method.

In an embodiment, the step of forming the coloring layer includes the step of forming fourth coloring lines extending in the first direction by a method other than the dry film method after the formation of the second coloring lines.

In another embodiment, the step of forming the coloring layer includes the step of forming dummy coloring portions in the gaps between the plurality of first coloring portions using a coloring material for forming the fourth coloring lines.

In yet another embodiment, the step of forming the coloring layer includes the step of forming fourth coloring lines extending in the first direction by a method other than the dry film method after the formation of the third coloring lines.

In yet another embodiment, the step of forming the coloring layer includes the step of forming dummy coloring portions in the gaps between the plurality of first coloring portions and the gaps between the plurality of second coloring portions using a coloring material for forming the fourth coloring lines.

In yet another embodiment, the step of forming the coloring layer includes the step of forming fifth coloring lines before the formation of the first coloring lines, and the step of forming fifth coloring lines includes the step of forming light shield portions having a length exceeding 1000 µm in the first direction from a metal film.

In yet another embodiment, the first coloring lines and the second coloring lines are coloring lines, different from each other, selected from the group consisting of red color filter lines, blue color filter lines, green color filter lines, while color filter lines, cyan color filter lines, magenta color filter lines, yellow color filter lines and light shield lines.

In yet another embodiment, the first coloring lines, the second coloring lines and the third coloring lines are coloring lines, different from one another, selected from the group consisting of red color filter lines, blue color filter lines, green color filter lines, while color filter lines, cyan color filter lines, magenta color filter lines, yellow color filter lines and light shield lines.

The color filter substrate of the present invention is preferably fabricated by the fabrication method described above.

The color filter substrate of the present invention includes a transparent substrate having a first edge and a second edge opposed to each other and a coloring layer provided on the transparent substrate, wherein the coloring layer includes first coloring lines and second coloring lines each extending in a first direction from the first edge to the second edge, the coloring lines being placed side by side in a second direction crossing the first direction, each of the first coloring lines includes a plurality of first coloring portions lined in the first direction with a gap given between the adjacent first coloring portions, and dummy coloring portions are formed from a blue dry film in the gaps between the first color portions.

The width of the gaps in the first direction is preferably 10 µm or less.

The distance between the gaps adjacent in the first direction is preferably 1000 µm or less.

The display device of the present invention preferably includes the color filter substrate described above, an active matrix substrate opposed to the color filter substrate, and a display medium layer interposed between the color filter substrate and the active matrix substrate, wherein the active matrix substrate has interconnections extending in the second direction, and the gaps of the color filter substrate and the interconnections of the active matrix substrate are placed to face each other.

Alternatively, the display device of the present invention preferably includes the color filter substrate described above.

According to the fabrication method for a color filter substrate of the present invention, each of the first coloring lines formed prior to formation of the second coloring lines is composed of a plurality of first coloring portions lined with a gap given between the adjacent first coloring portions. Therefore, staying of bubbles between the second coloring lines and the substrate is minimized, and thus the degree of freedom in the adhesion direction of the dry film for the second coloring lines can be made higher than that conventionally allowed.

BRIEF DESCRIPTION OF THE DRAWINGS

FIG. 12 is a partial plan view of the conventional color filter substrate.

DETAILED DESCRIPTION OF THE INVENTION

Figure 1:
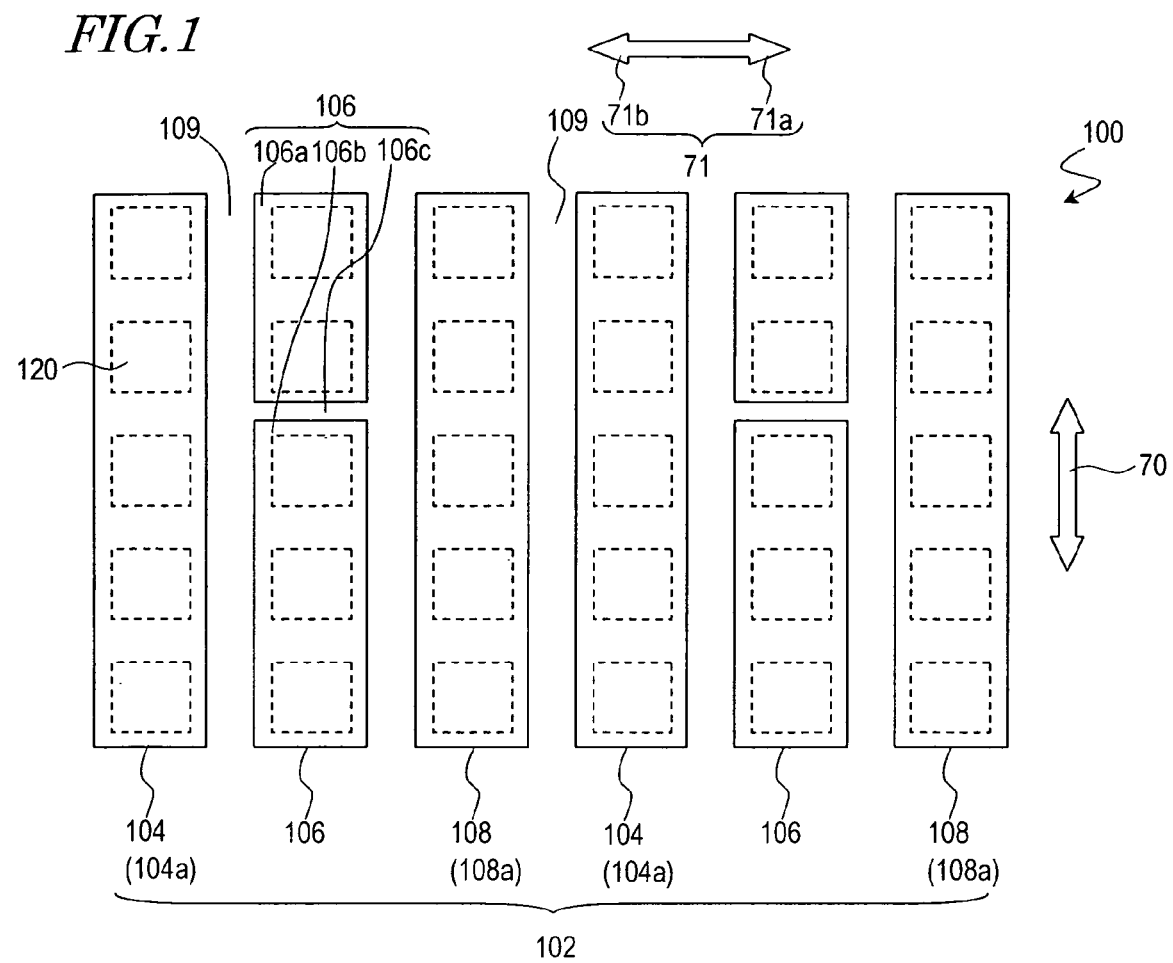
FIG. 1 is view illustrating a color filter substrate 1 of an embodiment of the present invention.

Preferred embodiments of the present invention will be described with reference to the accompanying drawings.

A color filter substrate of the present invention includes a transparent substrate and a coloring layer formed on the transparent substrate. The coloring layer includes a plurality of coloring lines. The plurality of coloring lines, each extending in a given direction (first direction), are placed side by side in a second direction crossing the first direction. The plurality of coloring lines include first coloring lines and second coloring lines. A fabrication method for a color filter substrate of the present invention includes the step of forming the coloring layer. In the step of forming the coloring layer, the first coloring lines, each having a plurality of first coloring portions lined in the first direction with a gap given between the adjacent portions, are formed. After formation of the first coloring lines, a dry film for the second coloring lines is pressed against the transparent substrate to be stuck on the substrate along a third direction (adhesion direction) crossing the first direction, and then subjected to predetermined patterning, to form the second coloring lines.

In the fabrication method for a color filter substrate of the present invention, each of the first coloring lines formed prior to formation of the second coloring lines is composed of a plurality of first coloring portions lined with a gap given between the adjacent portions, not composed of a single stripe-shaped coloring portion. Therefore, the adhesion direction of the dry film for the second coloring lines can be a direction other than the direction (first direction) of extension of the first coloring lines (that is, can be a third direction crossing the first direction) because bubbles generated between the dry film and the substrate can escape through the gaps formed between the plurality of first coloring portions. Thus, the dry film for the second coloring lines can be stuck on the substrate along a direction other than the direction of extension of the previously formed first coloring lines.

The preferred range of the adhesion direction of the dry film for the second coloring lines to be formed by the dry film method after formation of the first coloring lines depends on the direction in which the gaps extend, which is preferably from +45° to −45° with respect to the direction of extension of the gaps.

The "coloring lines" as used herein include color filter lines and light shield lines. The color filter lines are placed to correspond to columns of pixels, and the light shield lines are placed between the adjacent color filter lines as required. The individual coloring lines may be composed of a single coloring portion or composed of a plurality of coloring portions lined with a gap given between the adjacent portions. The coloring lines include such gaps. The coloring lines may also include dummy coloring portions that are coloring portions formed in the gaps. The dummy coloring portions include dummy color filter portions that are color filter portions formed in the gaps and dummy light shield portions that are light shield portions formed in the gaps.

For example, a color filter substrate 1 shown in FIG. 1 has a coloring layer 102 including a plurality of coloring lines, that is, red color filter lines 104, green color filter lines 106 and blue color filter lines 108. The coloring layer 102 is typically composed of the red color filter line 104, the green color filter line 106 and the blue color filter line 108 placed side by side in this order cyclically in the row direction.

The above color filter lines respectively extend in the direction of columns of pixels 120 (direction 70) to correspond to the columns of pixels 120. Each of the red color filter lines 104 is composed of a single red color filter portion 104a, and each of the blue color filter lines 108 is composed of a single blue color filter portion 108a. However, each of the green color filter lines 106 is composed of a plurality of green color filter portions 106a and 106b and a gap 106c formed between the portions 106a and 106b.

The color filter substrate described above is fabricated in the following manner, for example, by using the dry film method.

The red color filter lines 104, among the three kinds of color filter lines, are first formed, and thereafter the green color filter lines 106 each composed of the plurality of green color filter portions 106a and 106b and the gap 106c formed therebetween are formed. The gap 106c is formed to extend in a direction parallel to the row direction, for example. The dry film for the green color filter lines 106 is pressed against the substrate to be stuck on the substrate along a direction 71a (from left to right as viewed from FIG. 1) of the opposite directions 71 crossing the column direction 70. In other words, the dry film for the green color filter lines 106 is stuck on the substrate from the side thereof corresponding to the already-formed red color filter line 104 toward the side corresponding to the region in which the blue color filter line 108 is to be formed later for each green color filter line 106. By adopting this adhesion direction, bubbles can escape into the regions in which the blue color filter lines 108 are to be formed, and thus are prevented from remaining in the regions of the green color filter lines 106 in the process of sticking the dry film for the green color filter lines on the substrate. The photosensitive resin layer of the dry film for the green color filter lines is then patterned in a photolithography process, to form the green color filter lines 106 having the gaps 106c.

The dry film for the blue color filter lines is then pressed against the resultant substrate to be stuck on the substrate along the direction 71b (from right to left as viewed from FIG. 1) opposite to the adhesion direction of the dry film for the green color filter lines. In other words, the dry film for the blue color filter lines is stuck on the substrate along a direction roughly parallel to the direction of extension of the gaps 106c. By adopting this adhesion direction, bubbles can escape through the gaps 106c formed in the green color filter lines 106, and thus are prevented from remaining in the regions of the blue color filter lines 108 in the process of sticking the dry film for the green color filter lines on the substrate.

As described above, gaps are formed in the green color filter lines (corresponding to the first coloring lines described above) that are formed prior to formation of the blue color filter lines (corresponding to the second coloring lines described above) and located adjacent to the blue color filter lines. With formation of such gaps, the adhesion direction of the dry film for the blue color filter lines can be a direction other than the direction 70 of extension of the already-formed green color filter lines because bubbles generated between the dry film and the substrate can escape through the gaps formed between the plurality of coloring portions. Thus, the dry film for the blue color filter lines can be stuck on the substrate along a direction other than the direction of extension of the already-formed green color filter lines.

The fabrication method for a color filter substrate of the present invention is particularly effective when a coloring resin layer (a resin layer left behind after a film support is removed from the dry film) having a thickness exceeding a given thickness is used for formation of the coloring lines to ensure a desired optical density (OD) value. The thickness of the coloring resin layer is about 1 µm to about 3 µm, for example. The OD value as used herein refers to the value indicating the transmittance of a material, in which a material having a greater OD value has a lower transmittance.

The width of the gaps in the first direction 70 is desirably 10 µm or more. The distance between the adjacent gaps in the first direction 70 is desirably 1000 µm or less, to ensure sufficient escape of bubbles generated between a dry film for coloring lines to be formed next and the substrate during adhesion of the dry film.

In the above description, all the color filter lines were formed by the dry film method. Alternatively, the color filter lines other than the blue color filter lines 108 may be formed by a method other than the dry film method (for example, a spin coat method, a die coat method and an ink jet method). The fabrication method is however facilitated by forming all the color filter lines by the dry film method.

In the above description, the coloring layer 102 included the red color filter lines 104, the green color filter lines 106 and the blue color filter lines 108. Alternatively, the kinds of the color filter lines included in the color filter layer are not limited to these. For example, the coloring layer 102 may include white color filter lines in addition to the above three kinds of color filter lines. Otherwise, cyan color filter lines, magenta color filter lines and yellow color filter lines may be included in place of the above three kinds of color filter lines. Japanese Laid-Open Patent Publication Nos. 21-296523 and 22-286927 respectively describe color filter substrates having four- and six-color color filter lines in detail.

Gaps 109 were provided between the adjacent color filter lines in FIG. 1. A black matrix may be formed to shield the gaps 109. Such a black matrix can be formed by patterning a metal film, for example. A black matrix made of a metal film can be thinner than that made of a black photosensitive resin layer to provide sufficient shielding. Therefore, a black matrix made of a metal film is free from blocking shift of bubbles and thus may be formed prior to formation of the color filter lines. In other words, the problem of bubbles will not occur even when color filter lines are formed by the dry film method after a black matrix in the shape of stripes with no gap therein (having a length exceeding 1000 µm) has been formed along both sides of regions in which color filter lines are to be formed. Note that in the color filter substrate 1 of FIG. 1, if the black matrix for shielding the gaps 109 located between the color filter lines is formed last, the problem of bubbles will be avoided if a method other than the dry film method is used.

Figure 2:
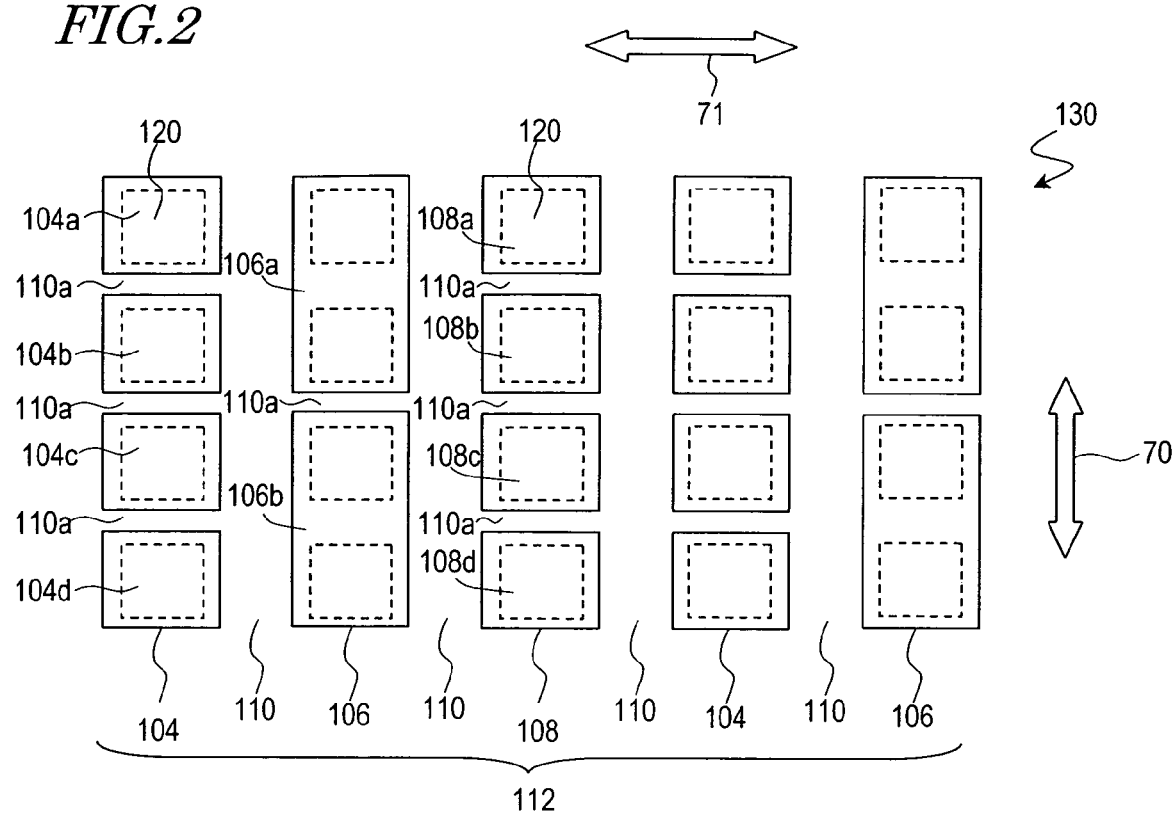
FIG. 2 is view illustrating a color filter substrate 130 of an embodiment of the present invention.

Nevertheless, if the black matrix is formed last using the dry film method, the arrangement shown in FIG. 2 may be adopted.

A color filter substrate 130 shown in FIG. 2 has a coloring layer 112 including a plurality of coloring lines, that is, red color filter lines 104, green color filter lines 106 and blue color filter lines 108, each of which has a plurality of color filter portions separated from one another with gaps. Each of the red color filter lines 104 has four red color filter portions 104a, 104b, 104c and 104d, each of the green color filter lines 106 has two green color filter portions 106a and 106b, and each of the blue color filter lines 108 has four blue color filter portions 108a, 108b, 108c and 108d. The coloring layer 112 further has a black matrix formed to fill the gaps between the color filter portions and the gaps between the adjacent color filter lines. Herein, the portions of the black matrix 110 formed between the adjacent color filter lines to extend in the direction of extension of the color filter lines are called light shield lines, and the portions thereof formed in the gaps in the color filter lines (gaps between the color filter portions) are called dummy light shield portions. That is to say, each of the color filter lines 104, 106 and 108 is composed of a plurality of color filter portions and dummy light shield portions. And, the coloring layer 112 is typically composed of the red color filter line 104, the light shield line 110, the green color filter line 106, the light shield line 110, the blue color filter line 108 and the light shield line 110 placed side by side in this order cyclically in the row direction.

With the gaps formed in all the color filter lines 104, 106 and 108 as shown in FIG. 2, the black matrix can be formed last by the dry film method. Bubbles can escape through the gaps formed in the color filter lines during adhesion of the dry film even when the dry film is pressed to be stuck on the substrate along a direction crossing the column direction 70 (for example, either of the lateral directions 71 in FIG. 2), and thus are prevented from remaining in the light shield lines 110.

According to the fabrication method for a color filter substrate of the present invention, the problem of bubbles can be avoided by providing gaps in at least one kind of coloring lines adjacent to a kind of coloring lines formed last by the dry film method, that is, by providing gaps in a kind of coloring lines located at least one side of a kind of coloring lines formed last by the dry film method, as in the color filter substrate 1 of FIG. 1. In the color filter substrate 130 of FIG. 2, in which the light shield lines 110 are formed last by the dry film method on both sides of the color filter lines, gaps are provided in all the color filter lines. In the case of providing coloring lines having gaps on both sides of a kind of coloring lines formed last by the dry film method, as in the color filter substrate 130 of FIG. 2, the adhesion direction of the dry film may be either of the two opposite directions (directions of the arrows 71a and 71b in FIG. 1) orthogonal to the direction 70 of extension of the coloring lines, to avoid the problem of bubbles.

Bubbles may remain in the dummy light shield portions 110a formed in the gaps in the color filter lines. In this relation, to prevent occurrence of a color dropout, the dummy light shield portions 110a may be placed to face light shield members such as gate bus lines and storage capacitance lines (provided in the active matrix substrate).

As described above, according to the fabrication method for a color filter substrate of the present invention, the adhesion direction of a dry film for coloring lines to be formed can be a direction crossing the direction of extension of coloring lines already formed on the substrate, and yet a color filter substrate with minimized degradation in display quality can be fabricated. Therefore, the degree of freedom for the adhesion direction is high compared with the conventional methods. This enables use of a dry film having a smaller width than the conventional ones, and thus reduces the fabrication cost. Specifically, when the color filter substrates of FIGS. 1 and 2 are in the shape of a rectangle of 680 mm×880 mm and have coloring lines extending along the shorter side, the adhesion direction of a dry film can be a direction along the longer side, and thus a dry film having a width of 680 mm can be used. In addition, the widths of dry films for all coloring lines can be made uniform. The adhesion direction of dry films for all coloring lines can also be made uniform, and this reduces the production loss due to changeovers in the fabrication process.

The direction of extension of the gaps may be determined appropriately depending on the desired adhesion direction of dry films, which may be a direction other than the directions roughly orthogonal to the extension of the coloring lines.

Hereinafter, the color filter substrate and the fabrication method therefor will be described further more specifically with reference to the relevant drawings. In the following description, a color filter substrate formed by the dry film method used for an active matrix liquid crystal display device will be exemplified, as in the prior art description, although the present invention is not limited to this.

Figure 3:
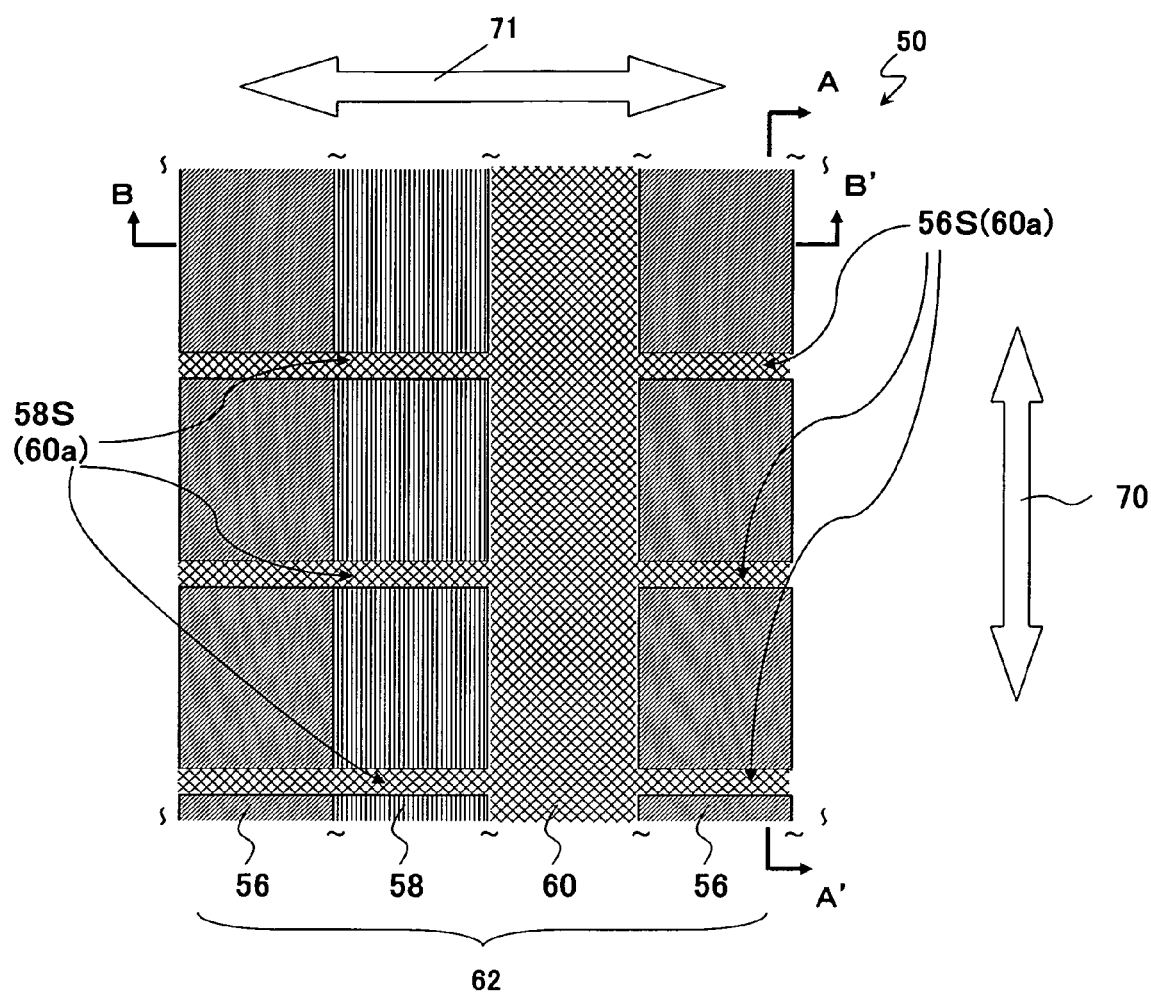
FIG. 3 is view illustrating a color filter substrate 50 of an embodiment of the present invention.

FIG. 3 is a partial plan view of a color filter substrate 50 of an embodiment of the present invention. FIGS. 4A to 4D are views for demonstrating a fabrication method for the color filter substrate 50, which are respectively cross-sectional views taken along line B-B' in FIG. 3. The color filter substrate 50 will be described with reference to FIGS. 3 and 4A to 4D.

As shown in FIGS. 3 and 4A to 4D, the color filter substrate 50 of an embodiment of the present invention includes a transparent substrate 14 and a coloring layer 62 formed on the transparent substrate 14. The coloring layer 62 includes red color filter lines 56, green color filter lines 58 and blue color filter lines 60 extending in the shape of stripes. The red, green and blue color filter lines are respectively placed to correspond to columns of pixels, and extend in the direction from the first end (not shown) of the transparent substrate 14 toward the second end opposite to the first end (this direction is called the first direction (direction of the arrow 70)). The red color filter lines 56, the green color filter lines 58 and the blue color filter lines 60 are placed side by side in the direction orthogonal to the direction 70 (this direction is called the second direction (direction of the arrow 71)). Although two red color filter lines 56, one green color filter line 58 and one blue color filter line 60 are shown in FIG. 3, the coloring layer 62 actually includes a plurality of sets of the red, green and blue color filter lines that are arranged cyclically. All of the red color filter lines 56, the green color filter lines 58 and the blue color filter lines 60 are formed in this order by the dry film method.

In the color filter substrate 50, each of the color filter lines other than the blue color filter lines 60 formed last, that is, each of the red color filter lines 56 and the green color filter lines 58 includes a plurality of color filter portions separated with a gap (slit) 56S or 58S. The slits 56S and 58S communicate with each other to extend in the second direction 71.

As will be described in detail in relation to the fabrication method to follow, with the formation of the slits 56S and 58S in the color filter lines, the dry film can be stuck on the substrate along a direction other than the direction 70 of extension of the color filter lines (direction 71 orthogonal to the direction 70) in formation of the blue color filter lines 60 because bubbles generated between the dry film and the substrate 14 can escape through the slits 56S and 58S.

An example of the fabrication method for the color filter substrate 50 will be described with reference to FIGS. 3 and 4A to 4D. Note that in the following method, all the color filter lines 56, 58 and 60 constituting the coloring layer 62 are formed using dry films.

Each of the dry films is composed of a photosensitive resin layer and film supports made of a polyethylene terephthalate (PET) film and the like sandwiching the photosensitive resin layer from both major surfaces. Three kinds of dry films in which red, blue and green pigments are respectively dispersed in the photosensitive resin films are used. The photosensitive resin films are typically of a negative type. The color filter layer is formed in the following manner, for example.

Figure 4A:
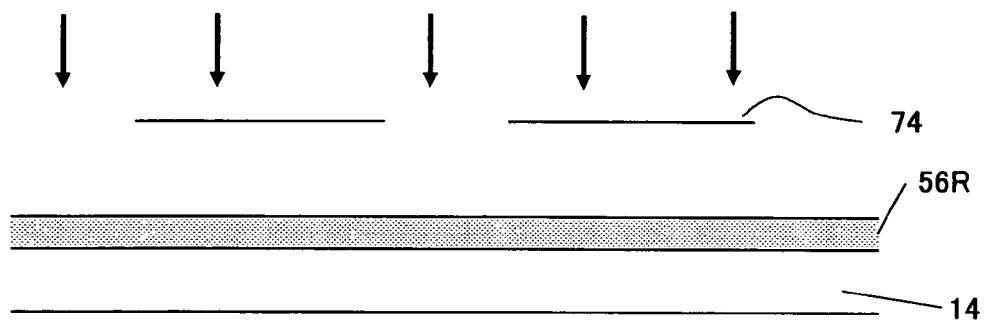
FIGS. 4A to 4D are views for demonstrating a fabrication method for the color filter substrate 50.
Figure 4B:
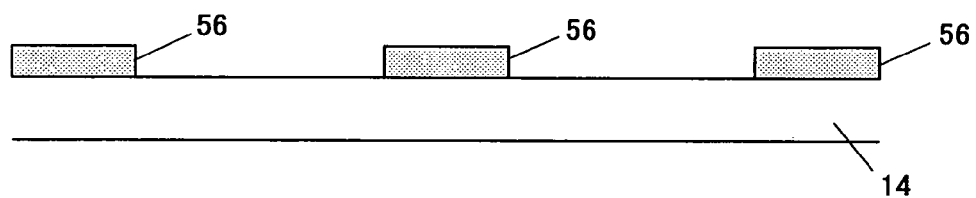

A dry film 56R for the red color filter lines 56 is pressed against the substrate 14 with a roller 34 (see FIG. 5) to be stuck on the substrate 14 along the second direction 71. The film support is then removed to transfer the photosensitive resin layer for the red color filter lines 56 to the substrate 14, as shown in FIG. 4A. This process step is generally performed under heating of the dry film and thus is a thermal transfer step. Exposure and development are then performed using a mask 74 (photolithography step) to pattern the dry film 56R to give the slits 56S (FIG. 3) extending in the second direction 71, to thereby form the red color filter lines 56 as shown in FIG. 4B.

Figure 4C:
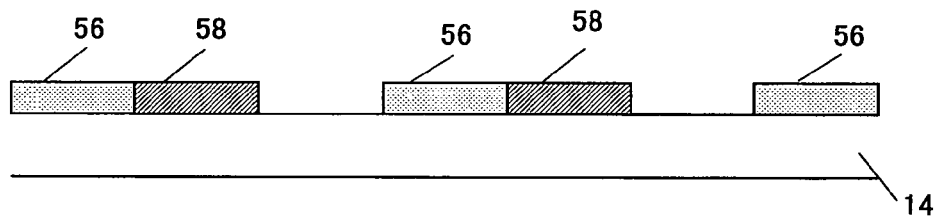

After the formation of the red color filter lines 56, a dry film for the green color filter lines 58 is pressed against the substrate 14 to be stuck on the substrate 14 along the direction 71 roughly orthogonal to the direction 70 of extension of the red color filter lines 56. Since the previously-formed red color filter lines 56 have the slits 56S, bubbles generated between the dry film for the green color filter lines 58 and the substrate can escape through the slits 56 and also the regions in which the blue color filter lines 60 are to be formed during the adhesion of the dry film to the substrate 14. The dry film is then patterned to give the slits 58S extending in the second direction 71 in the same manner as that for the formation of the red color filter lines 56, to thereby form the green color filter lines 58 as shown in FIG. 4C.

The slits 56S and 58S are preferably formed to communicate with each other as shown in FIG. 3. The reason is that with the communication of the slits formed in the adjacent color filter lines with each other, bubbles generated between the dry film for the blue color filter lines 60 formed last and the substrate can easily escape through these slits during adhesion of the dry film to the substrate.

The width of the slits 56S in the first direction 70 is desirably 10 μm or more. The distance between the adjacent slits 56S in the first direction 70 is desirably 10 μm or less, to ensure sufficient escape of bubbles generated between a dry film for coloring lines to be formed next and the substrate during adhesion of the dry film to the substrate.

Figure 4D:
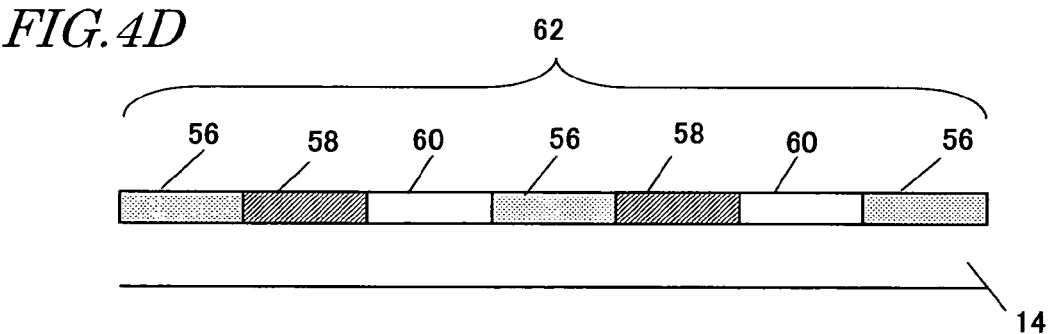

After the formation of the green color filter lines 58, the blue color filter lines 60 are formed as shown in FIG. 4D, by sticking a dry film for the blue color filter lines on the substrate 14 along the second direction 71 as in the formation of the red and green color filter lines. In this case, however, the patterning is made to give stripes having no slits.

Hereinafter, the step of forming the blue color filter lines 60 will be described in more detail.

Figure 5:
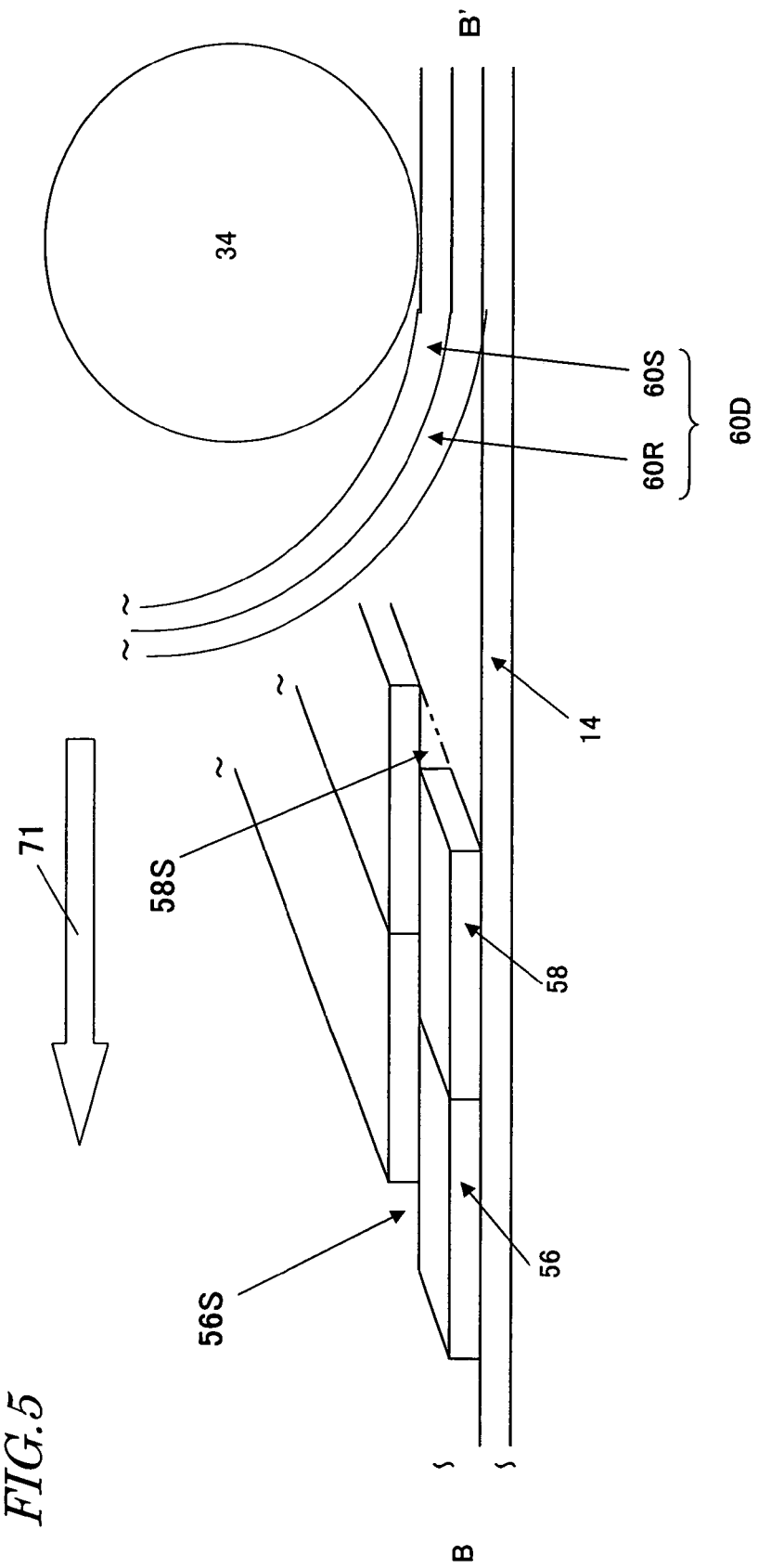
FIG. 5 is a view for demonstrating a process step of forming coloring lines formed last (according to the present invention).

FIG. 5 is a view for demonstrating the step of forming the blue color filter lines 60, showing the portion of the color filter substrate 50 corresponding to line B-B' in FIG. 3 as observed in the direction of the arrow 71. For comparison, FIG. 6 shows a view for demonstrating the conventional step of forming the blue color filter lines 20.

The dry film 60D for the blue color filter lines 60 is pressed against the transparent substrate 14 with the roller 34 to be stuck on the substrate. The film support 60S is then removed to thereby transfer the photosensitive resin layer 60R for the blue color filter lines 60 to the substrate 14. The adhesion of the dry film 60D is made along the direction 71 (second direction).

At the time of adhesion of the blue color filter lines 60 to the substrate 14, the area of the substrate other than the regions in which the blue color filter lines 60 are to be formed is already covered with the other color filter lines 56 and 58.

Figure 6:
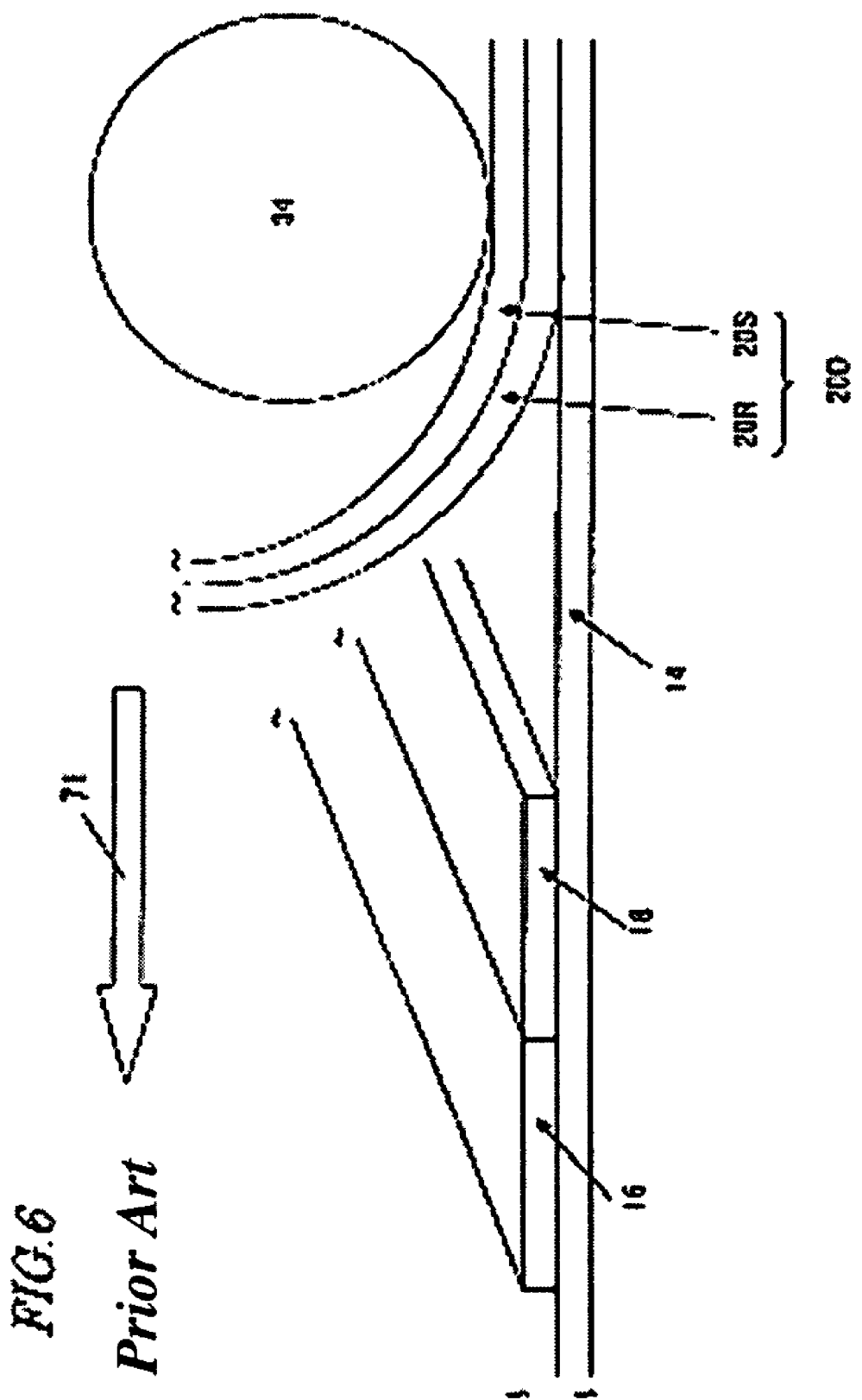
FIG. 6 is a view for demonstrating a process step of forming coloring lines formed last (comparative example).

In the conventional case, in which each of the red color filter lines 16 and the green color filter lines 18 is composed of a single stripe-shaped color filter portion, that is, the red color filter lines 16 and the green color filter lines 18 have no slits, as shown in FIG. 6, the regions in which the blue color filter lines 20 are to be formed are surrounded with the previously-formed red color filter lines 16 and green color filter lines 18. Accordingly, during the pressing of the dry film 20D for the blue color filter lines 20 to be stuck on the substrate, bubbles existing between the substrate 14 and the dry film 20D fail to escape outside since they are blocked with the red color filter lines 16 and the green color filter lines 18. When a bubble exists, the photosensitive resin layer fails to be formed on the portion of the bubble, and thus a color dropout arises.

On the contrary, in this embodiment, the red color filter lines 56 and the green color filter lines 58 respectively include slits 56S and 58S communicating with each other. These slits 56S and 58S also communicate with the regions in which the blue color filter lines are to be formed, and extend in a direction parallel to the adhesion direction of the dry film 60D for the blue color filter lines.

Accordingly, as shown in FIG. 5, during the adhesion of the dry film 60D for the blue color filter lines along the second direction 71, bubbles can escape outside through the slits 56S and 58S from downstream toward upstream of the dry film adhesion direction. In this way, staying of bubbles between the last-formed blue color filter lines 60 and the substrate 14 can be minimized.

After the adhesion of the dry film 60D, the dry film 60D is patterned, to form the blue color filter lines 60 each in a stripe shape having no slit.

In the color filter substrate of FIG. 3, in which color filter lines having slits exist on both sides of a region in which a last-formed color filter line is to be formed, the adhesion direction of the dry film may be either of the two opposite directions (directions of the arrows 71a and 71b) orthogonal to the direction 70 of extension of the color filter lines.

In the patterning of the blue color filter lines, it is preferred to pattern the dry film 60D so that the blue color resin layer 60R remains in the slits 56R of the red color filter lines 56 and the slits 58S of the green color filter lines 58 to thereby give dummy color filter portions 60a, as shown in FIG. 3. The existence of the blue color resin layer 60R in the slits 56S and 58S has the advantage that a color dropout is not easily visually recognized compared with the case of providing no resin layer at all. In particular, since the blue color resin layer 60R is lowest in visibility among the red, green and blue color resin layers, it is preferred to use the blue color resin layer 60R in formation of the dummy coloring portions.

In the patterning for the last-formed blue color filter lines 60, light exposure is preferably made from the back of the substrate 14 (backside exposure). This permits self-aligned patterning with respect to the red color filter lines 56 and the green color filter lines 58, and thus prevents pattern displacement that may occur when light exposure is made from the front via a mask. Therefore, high-precision patterning free from misalignment is ensured, and occurrence of a color dropout is prevented.

When light exposure for the patterning is made from the front via the mask 74, the color filter lines may be formed so that the edges thereof overlap each other to secure a margin for misalignment to thereby ensure that no color dropout occurs when a displacement occurs between the mask and the substrate.

The coloring layer 62 is thus formed in the manner described above. Thereafter, a protection film, a counter electrode, an alignment film and the like are formed as required by a known method to thereby fabricate the color filter substrate 50.

Figure 7:
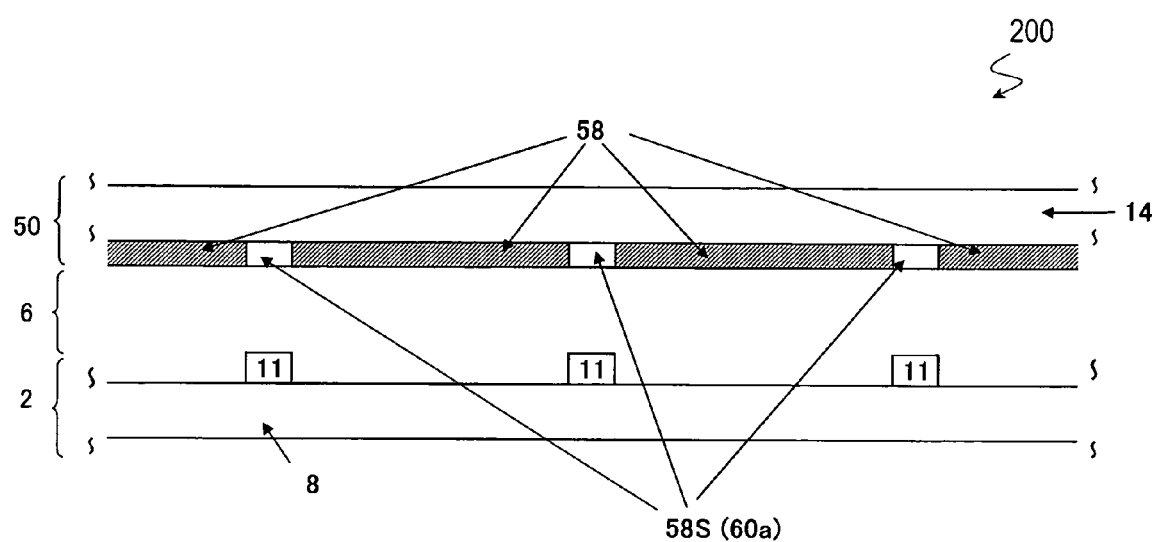
FIG. 7 is a view illustrating a liquid crystal display device 2 including the color filter substrate 50 of the present invention.

The color filter substrate 50 in this embodiment can be used for a liquid crystal display device. FIG. 7 is a cross-sectional view of a liquid crystal display device 2 having the color filter substrate 50. The color filter substrate 50 shown in FIG. 7 corresponds to the cross section of the color filter substrate 50 taken along line A-A' in FIG. 3.

The liquid crystal display device 2 includes the color filter substrate 50, an active matrix substrate 2 opposed to the color filter substrate 50, and a liquid crystal layer 6 interposed between the two substrates. The liquid crystal display device 2 can be fabricated by a known method.

In fabrication of the liquid crystal display device 2, the slits 56S and 58S (or the dummy color filter portions 60a) are desirably formed at positions facing interconnections 11 serving as light shields, such as gate bus lines and storage capacitance lines, of the active matrix substrate 2. Each storage capacitance line is provided somewhere between two gate bus lines adjacent to each other in the first direction 70, for example. Note that components other than the interconnections 11 of the active matrix substrate 2 are omitted in FIG. 7 for simplification.

By forming the slits 56S and 58S to face the interconnections 11, color dropouts occurring due to existence of bubbles, if any, can be shielded with the interconnections 11 and thus will not be easily visually recognized. Degradation in display quality is therefore prevented.

The slits 56S and 58S may be provided to correspond to all the gate bus lines or all the storage capacitance lines, or to correspond to all the gate bus lines and all the storage capacitance lines. Otherwise, the slits may be provided to correspond to one line every set of two gate bus lines adjacent to each other in the first direction 70 and one storage capacitance line formed between these gate bus lines. Note however that the distance between the adjacent slits (in the first direction 70) provided in one color filter line is preferably 1000 μm or less as described above.

Figure 8:
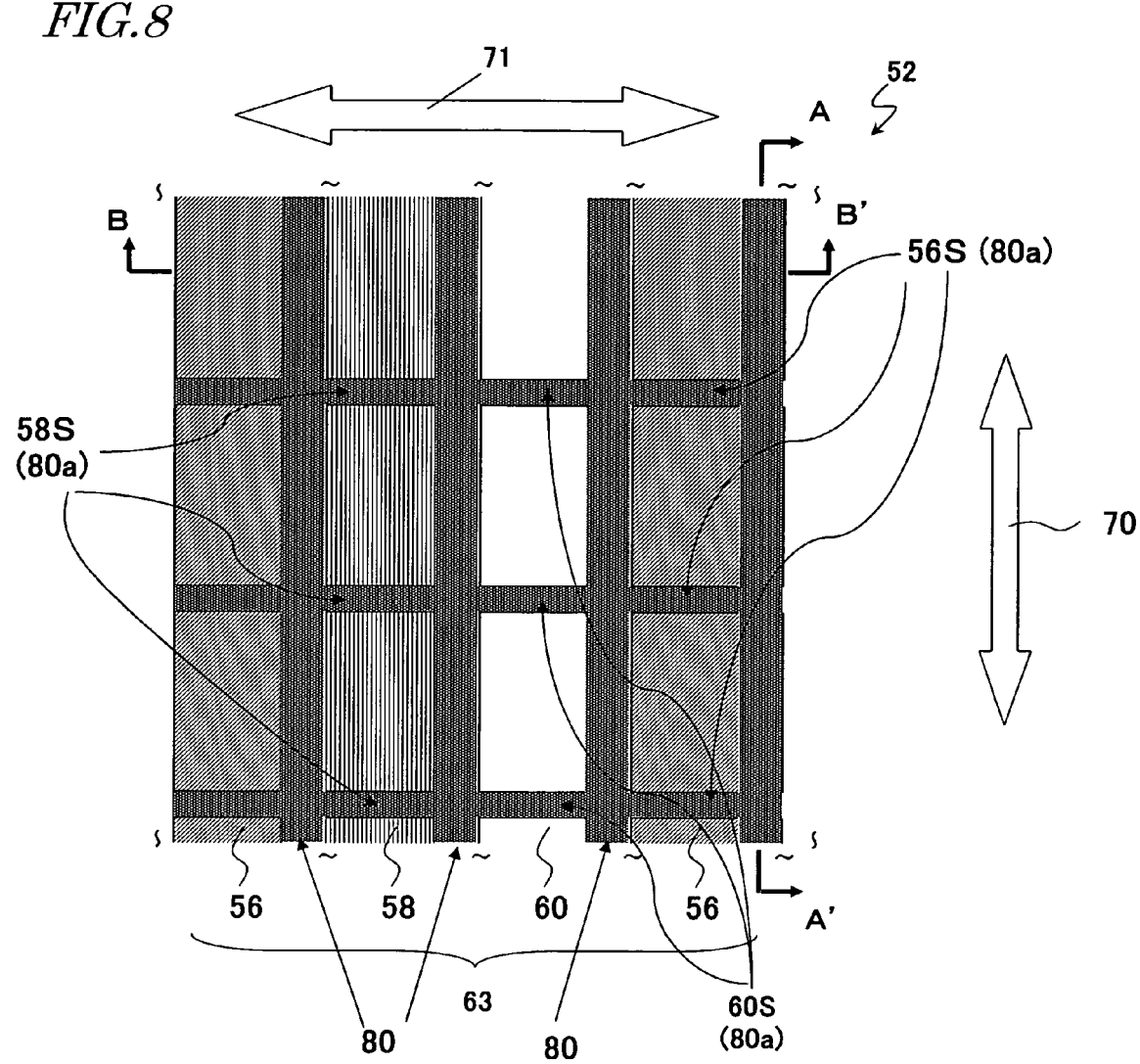
FIG. 8 is a view illustrating a color filter substrate 52 of an embodiment of the present invention.

FIG. 8 is a view illustrating a color filter substrate 52 having a light shield line formed between every two adjacent color filter lines, in which the light shield lines are formed last by the dry film method. The construction of the color filter substrate 52 and a fabrication method therefor will be described with reference to FIG. 8.

Figure 10:
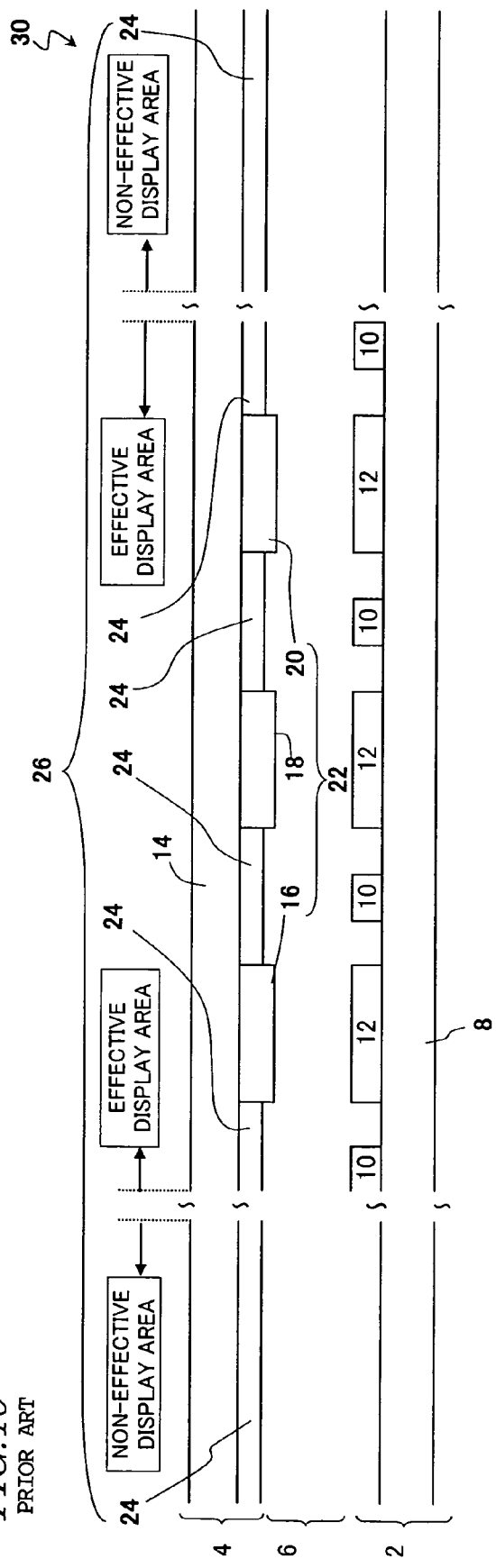
FIG. 10 is a diagrammatic cross-sectional view of an ordinary active matrix liquid crystal display device.
Figure 11A:
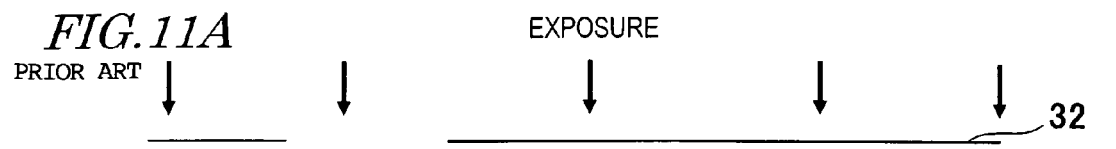
FIGS. 11A to 11F are views for demonstrating a conventional fabrication method for a color filter substrate using the dry film method.
Figure 11B:
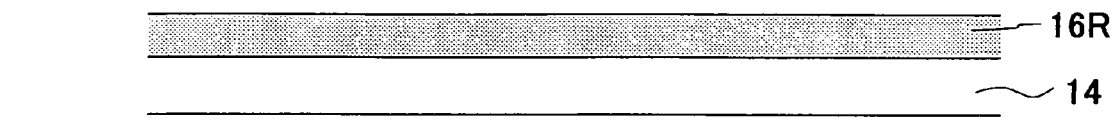
Figure 11C:
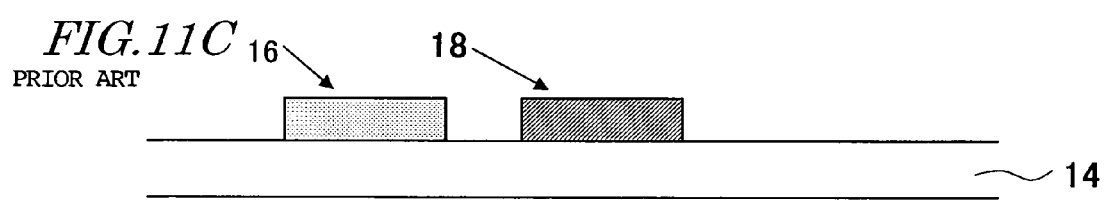
Figure 11D:
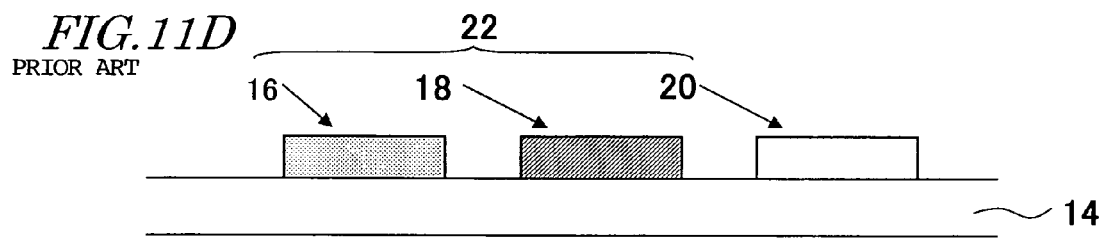
Figure 11E:
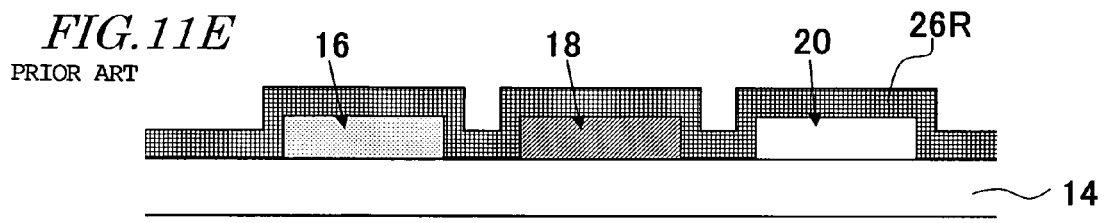
Figure 11F:
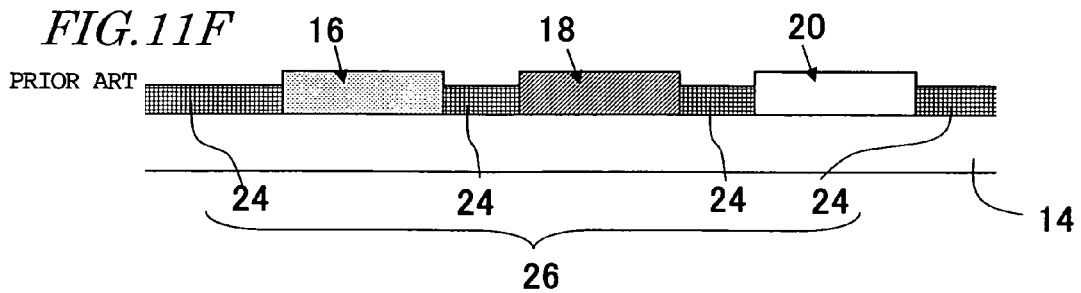

A coloring layer 63 of the color filter substrate 52 includes red color filter lines 56, green color filter lines 58, blue color filter lines 60 and light shield lines 80, which are placed side by side in the order of the red color filter line 56, the light shield line 80, the green color filter line 58, the light shield line 80, the blue color filter line 60 and the light shield line 80 cyclically in the second direction 71 orthogonal to the direction of extension of the color filter lines. The red, blue and green color filter lines are placed to correspond to columns of pixels. The light shield lines 80 are placed to face the source bus lines 10 of the active matrix substrate 2 (see FIG. 10) when the color filter substrate 52 is combined with the active matrix substrate 2, for example, to constitute a liquid crystal display device. The width of the light shield lines 80 (in the second direction 71) is smaller than the width of the color filter lines 56, 58 and 60. For example, when the width of the color filter lines 56, 58 and 60 is 82 μm, the width of the light shield lines 80 is 17 μm. The red color filter lines 56, the green color filter lines 58, the blue color filter lines 60 and the light shield lines 80 are formed in this order by the dry film method.

In the color filter substrate 52, the coloring lines other than the light shield lines 80 formed last among all the coloring lines, that is, the red color filter lines 56, the green color filter lines 58 and the blue color filter lines 60 respectively include a plurality of color filter portions separated from one another with gaps (slits) 56S, 58S and 60S. The slits 56S, 58S and 60S are formed to communicate with one another to extend in the second direction 71 via the light shield lines 80. In formation of the light shield lines 80, therefore, bubbles generated between the dry film and the substrate 14 can escape through the slits 56S, 58S and 60S during adhesion of the dry film to the substrate along the second direction 71.

A black resin layer for formation of the light shield lines 80 is patterned to remain in the slits 56S, 58S and 60S, to provide dummy light shield portions 80a. The dummy light shield portions 80a are preferably placed to correspond to interconnections serving as light shields, such as gate bus lines and storage capacitance lines, of an active matrix substrate.

In formation of the red color filter lines 56, the green color filter lines 58 and the blue color filter lines 60 of the color filter substrate 52, each dry film for the color filter lines is pressed against the substrate 14 to be stuck on the substrate 14 along the second direction 71 and then patterned, as in the formation of the color filter lines 56 and 58 of the color filter substrate 50 shown in FIG. 3. As shown in FIG. 8, the patterning is made so that the slits 56S, 58S and 60S communicate with one another via the regions in which the light shield lines 80 are to be formed.

In formation of the green color filter lines 58 after formation of the red color filter lines 56, bubbles can escape through the regions in which the blue color filter lines 60 and the light shield lines 80 are to be formed and also through the slits 56S during adhesion of the dry film to the substrate 14 along the second direction 71. Staying of bubbles between the green color filter lines 58 and the substrate is therefore minimized. Likewise, in formation of the blue color filter lines 60 after the formation of the green color filter lines 58, bubbles can escape through the regions in which the light shield lines 80 are to be formed and also through the slits 56S and 58S during adhesion of the dry film to the substrate 14 along the second direction 71, and thus staying of bubbles between the blue color filter lines 60 and the substrate is minimized.

After the formation of all the color filter lines 56, 58 and 60, the light shield lines 80 are formed using a dry film.

The area of the substrate 14 other than the regions in which the light shield lines 80 are to be formed is already covered with the color filter lines 56, 58 and 60 at the time of adhesion of the dry film for the light shield lines 80 to the substrate 14. However, since the color filter lines include the slits 56S, 58S and 60S communicating with one another via the regions in which the light shield lines are to be formed, bubbles can escape through these slits during adhesion of the dry film for the light shield lines along the second direction 71. This minimizes staying of bubbles between the light shield lines 80 and the substrate. Thereafter, the dry film is patterned to give the light shield lines 80 each in a stripe shape.

The patterning for the light shield lines 80 is performed so that the black resin layer also remains in the slits 56S of the red color filter lines 56, the slits 58S of the green color filter lines 58 and the slits 60S of the blue color filter lines 60, to provide dummy light shield portions 80a. The existence of the black resin layer in the slits 56S, 58S and 60S has the advantage that light leakage is not easily visually recognized compared with the case of providing no resin layer at all.

In the patterning for the light shield lines 80, light exposure is preferably made from the back of the substrate 14 (backside exposure).

When light exposure for the patterning is made from the front via the mask 74, the color filter lines and the light shield lines may be formed so that the edges thereof overlap each other to secure a margin for misalignment to thereby ensure that no color dropout occurs when a displacement occurs between the mask and the substrate.

Figure 9:
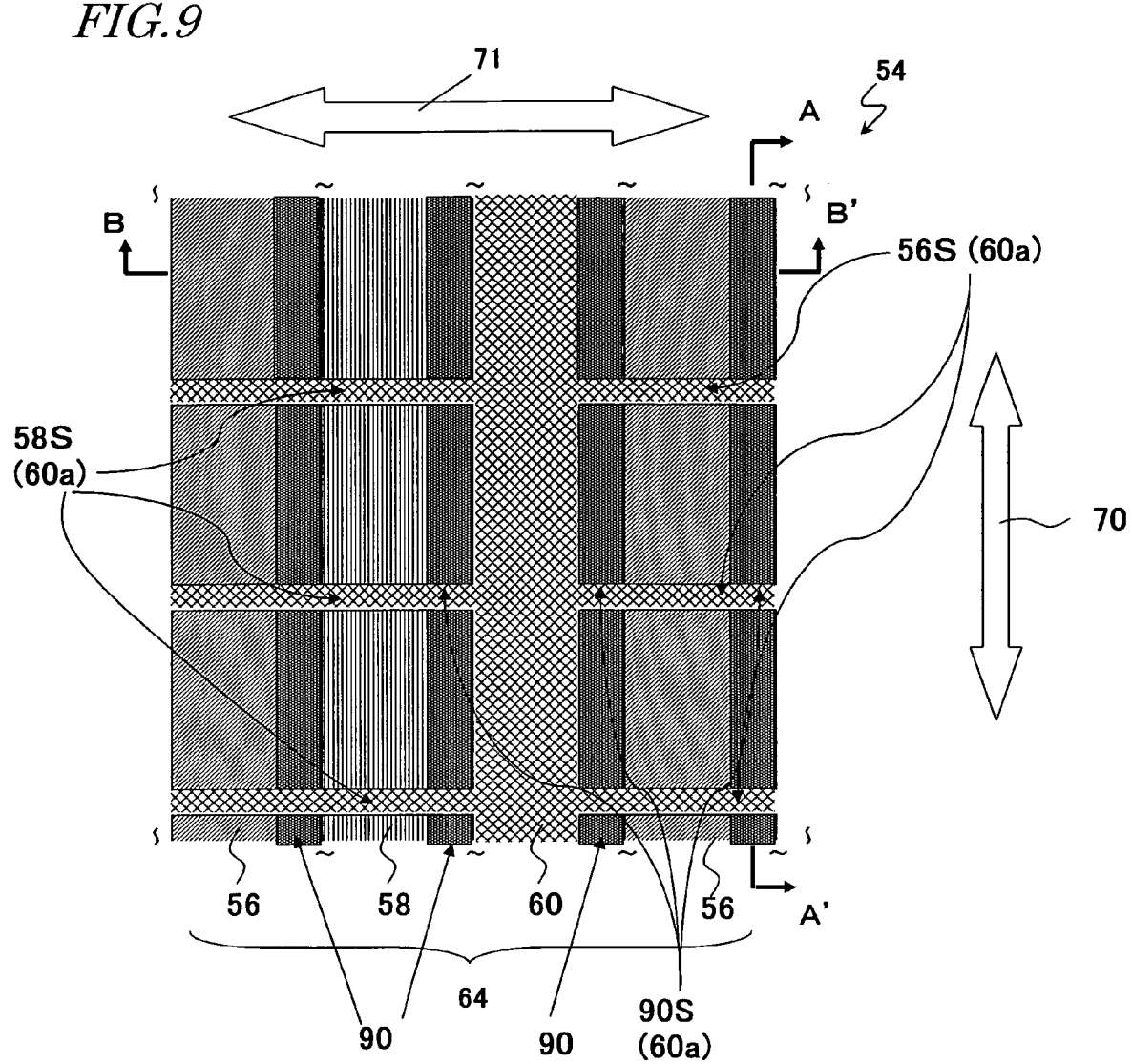
FIG. 9 is a view illustrating a color filter substrate 54 of an embodiment of the present invention.

FIG. 9 is a view illustrating a coloring layer 64 of a color filter substrate 54 in which light shield lines are formed prior to formation of color filter lines. The color filter substrate 54 can be basically fabricated in the same manner as that for the color filter substrate 52 except that coloring lines are formed in the order of light shield lines 90, red color filter lines 56, green color filter lines 58 and blue color filter lines 60.

In the color filter substrate 54, the coloring lines other than the blue color filter lines 60 formed last among all the coloring lines, that is, the light shield lines 90, the red color filter lines 56 and the green color filter lines 58 respectively have gaps (slits) 90S, 56S and 58S. The slits 56S, 58S and 90S are formed to communicate with one another to extend in the second direction 71 via the blue color filter lines 60.

By providing the slits 56S, 58S and 90S, in formation of the red color filter lines 56, the green color filter lines 58 and the blue color filter lines 60 after formation of the light shield lines 90, it is possible to prevent bubbles from remaining in the regions in which the red color filter lines 56, the green color filter lines 58 and the blue color filter lines 60 are to be formed during adhesion of the respective dry films to the substrate along the second direction 71.

The color filter substrate of the present invention is usable for color display devices such as liquid crystal display devices and organic EL display devices.

While the present invention has been described in preferred embodiments, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

This non-provisional application claims priority under 35 USC § 119(a) on Patent Application No. 23-429719 filed in Japan on Dec. 25, 2003, the entire contents of which are hereby incorporated by reference.

What is claimed is:

1. A fabrication method for a color filter substrate comprising a transparent substrate having a first edge and a second edge opposed to each other and a coloring layer provided on the transparent substrate, the transparent substrate having longer edges and shorter edges, the first and second edges being longer edges, the coloring layer including a plurality of coloring lines each extending in a first direction from the first edge to the second edge, the plurality of coloring lines being placed side by side in a second direction substantially orthogonal to the first direction, the plurality of coloring lines comprising first coloring lines, second coloring lines, and third coloring lines, the first coloring lines each including a plurality of first coloring portions lined in the first direction provided with a first gap between the adjacent first coloring portions, the second coloring lines each including a plurality of second coloring portions lined in the first direction with a second gap provided between the adjacent second coloring portions, dummy coloring portions provided in the first and second gaps, the fabrication method comprising the step of forming the coloring layer, wherein the step of forming the coloring layer includes the steps of:

forming the first coloring lines;

forming the second coloring lines after the formation of the first coloring lines, the step of forming the second coloring lines including the step of pressing a dry film for the second coloring lines against the transparent substrate to stick the dry film on the transparent substrate along the second direction;

forming the third coloring lines after the formation of the second coloring lines, the step of forming the third coloring lines including the step of pressing another dry film for the third coloring lines against the transparent substrate to stick the another dry film on the transparent substrate along the second direction; and forming the dummy coloring portions in the first and second gaps.

2. The fabrication method for a color filter substrate of claim 1, wherein the step of forming the coloring layer includes the step of forming the dummy coloring portions in the first and second gaps using the dry film for the third coloring lines.

3. The fabrication method for a color filter substrate of claim 1, wherein the distance between the first and second gaps adjacent in the first direction is 1000 µm or less.

4. The fabrication method for a color filter substrate of claim 1, wherein the width of the first and second gaps in the first direction is 10 µm or less.

5. The fabrication method for a color filter substrate of claim 1, wherein the step of forming the coloring lines formed last among the coloring lines of the coloring layer includes the step of performing back exposure using the previously-formed coloring lines as a mask.

6. The fabrication method for a color filter substrate of claim 1, wherein the dummy coloring portions are formed using a blue dry film.

7. The fabrication method for a color filter substrate of claim 1, wherein the dummy coloring portions are formed using a black dry film.

8. The fabrication method for a color filter substrate of claim 1, wherein the coloring layer includes coloring lines adjacent in the second direction having edges overlapping each other.

9. The fabrication method for a color filter substrate of claim 1, wherein the first coloring lines are formed by at least one method selected from the group consisting of a spin coat method, a die coat method, an ink jet method and a dry film method.

10. The fabrication method for a color filter substrate of claim 1, wherein the step of forming the coloring layer includes the step of forming fourth coloring lines extending in the first direction by a method other than the dry film method after the formation of the second coloring lines.

11. The fabrication method for a color filter substrate of claim 10, wherein the step of forming the coloring layer includes the step of forming dummy coloring portions in the gaps between the plurality of first coloring portions using a coloring material for forming the fourth coloring lines.

12. The fabrication method for a color filter substrate of claim 1, wherein the step of forming the coloring layer includes the step of forming fourth coloring lines extending in the first direction by a method other than the dry film method after the formation of the third coloring lines.

13. The fabrication method for a color filter substrate of claim 12, wherein the step of forming the coloring layer includes the step of forming dummy coloring portions in the gaps between the plurality of first coloring portions and the gaps between the plurality of second coloring portions using a coloring material for forming the fourth coloring lines.

14. The fabrication method for a color filter substrate of claim 1, wherein the step of forming the coloring layer includes the step of forming fifth coloring lines before the formation of the first coloring lines, and the step of forming fifth coloring lines includes the step of forming light shield portions having a length exceeding 1000 µm in the first direction from a metal film.

15. The fabrication method for a color filter substrate of claim 1, wherein the first coloring lines and the second coloring lines are coloring lines, different from each other, selected from the group consisting of red color filter lines, blue color filter lines, green color filter lines, white color filter lines, cyan color filter lines, magenta color filter lines, yellow color filter lines and light shield lines.

16. The fabrication method for a color filter substrate of claim 1, wherein the first coloring lines, the second coloring lines and the third coloring lines are coloring lines, different from one another, selected from the group consisting of red color filter lines, blue color filter lines, green color filter lines, white color filter lines, cyan color filter lines, magenta color filter lines, yellow color filter lines and light shield lines.

* * * * *

UNITED STATES PATENT AND TRADEMARK OFFICE
CERTIFICATE OF CORRECTION

PATENT NO. : 7,575,836 B2  Page 1 of 1
APPLICATION NO. : 11/015484
DATED : August 18, 2009
INVENTOR(S) : Tsubata et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1189 days.

Signed and Sealed this

Seventh Day of September, 2010

David J. Kappos
*Director of the United States Patent and Trademark Office*